June 5, 1928.

H. W. HOW

STIRRING DEVICE FOR DRIERS

Filed Jan. 12, 1924

Inventor
Harlan W. How
by Popp & Powers
Attorneys.

June 5, 1928.  
H. W. HOW  
STIRRING DEVICE FOR DRIERS  
Filed Jan. 12, 1924

Inventor  
Harlan W. How  
by Pepper & Powers  
Attorneys.

Patented June 5, 1928.

1,672,218

UNITED STATES PATENT OFFICE.

HARLAN W. HOW, OF BUFFALO, NEW YORK, ASSIGNOR TO BUFFALO FOUNDRY & MACHINE COMPANY, OF BUFFALO, NEW YORK, A CORPORATION OF NEW YORK.

STIRRING DEVICE FOR DRIERS.

Application filed January 12, 1924. Serial No. 685,738.

This invention relates to a rotary drier which is preferably operated under vacuo and capable of handling many materials including liquids, semi-liquids, solids in granular form, starch and other cereals, various by-products, fertilizers, dextrine, reclaimed rubber, rubber compounds, and so forth.

In evaporators of this character as heretofore constructed the stirring mechanism was so constructed that the scraper blades always occupied a definite relation to the shell or wall of the evaporator which rendered it exceedingly difficult, if not impossible, to pivotally mount the scraper blades so that upon rotating about the axis of the drying chamber these blades would engage properly with those surfaces of the chamber upon which the material rested, thereby causing improper drying of the material and reducing the efficiency of the apparatus.

It is the object of this invention to provide a stirring device for evaporators in which the blades while being carried bodily around the axis of the drying chamber are capable of moving freely toward and from the inner side of the same for the purpose of effectively scraping therefrom the material under treatment and also so constructing these blades that the same are pressed against the wall of the chamber while passing through the material, and the latter is also thoroughly mixed during the scraping operation, whereby all parts of the material are thoroughly and repeatedly subjected to the drying action and the drying of the material is effected expeditiously, uniformly and economically.

In the accompanying drawing.

Similar characters of reference indicate like parts in the several figures.

Figure 1:
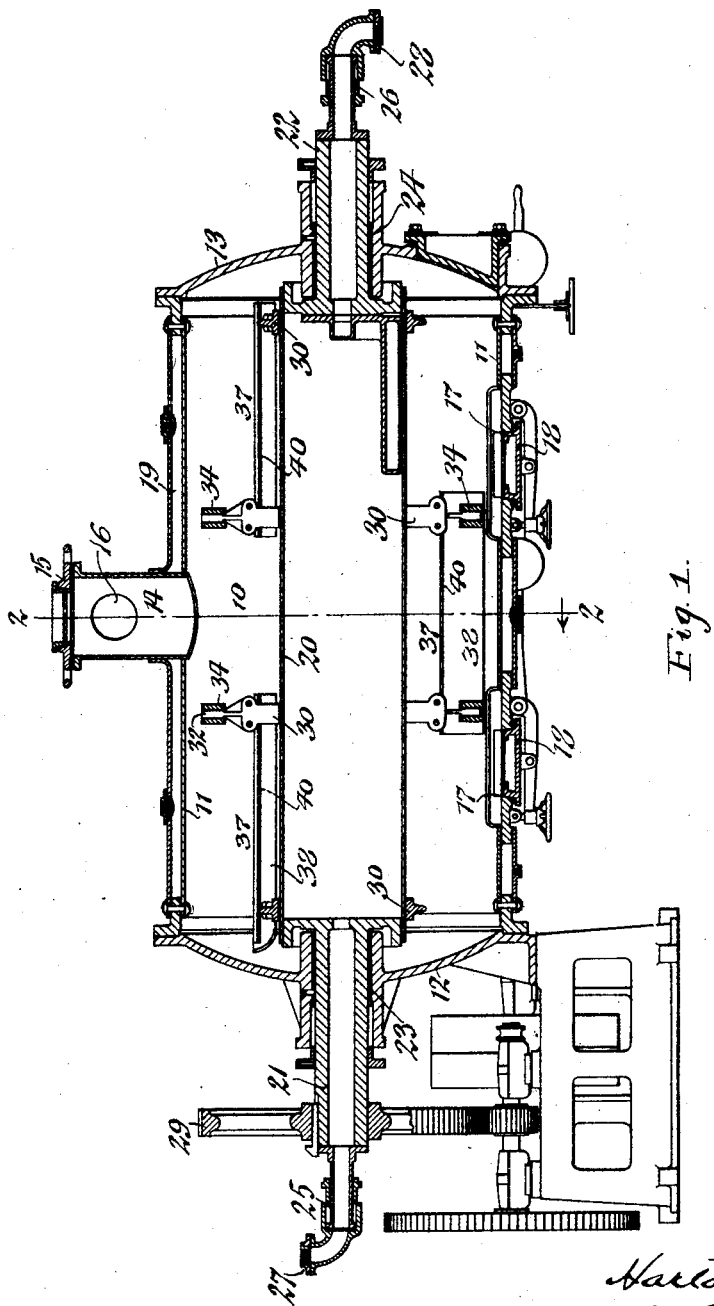
Figure 1 is a vertical longitudinal section of a rotary vacuum drier embodying my invention.
Figure 2:
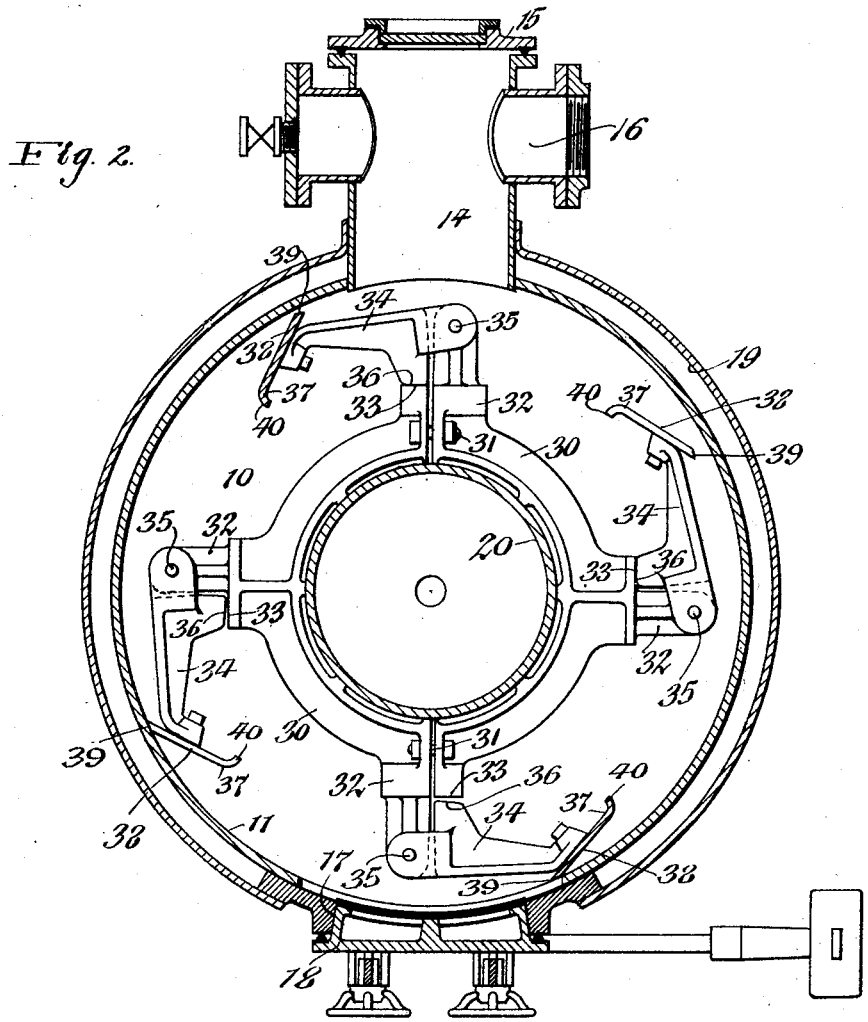
Figure 2 is a vertical cross section of the same, on an enlarged scale, taken on line 2—2, Figure 1.
Figure 3:
Figure 3 is a fragmentary plan view of one of the pivoted arms of the scraper blades.

The drying chamber 10 is of cylindrical form and preferably provided with a cylindrical shell or wall 11 which has its axis arranged horizontally or substantially so, and two heads 12, 13 secured to opposite ends of the shell and forming the enclosure therewith which constitutes the drying chamber. This chamber is stationary and may be supported in any suitable and approved manner. The material to be treated or dried in this chamber is introduced into the same by means of a spout 14 communicating with the top of the chamber and adapted normally to be closed by a cover 15 applied to the upper end of this spout. The vapors are withdrawn from the chamber and a vacuum is produced therein by means of a vapor outlet 16 arranged on one side of the spout and adapted to be connected with an exhausting device of any suitable character. On its under side the drying chamber is provided with one or more outlet or discharge openings 17 through which the material after being dried or treated is delivered from the chamber, these outlets being normally closed by doors 18 which may be opened and closed and held shut in any suitable manner.

For the purpose of applying heat to the chamber around its wall the latter is provided with a surrounding jacket 19 which may be supplied with steam or other heating agent in any approved manner.

The means for stirring the material in the chamber in accordance with my invention are preferably combined with the means for internally heating the material and in the preferred form of the same, as shown in the drawings, the same are constructed as follows:

The numeral 20 represents the central section of a tubular shaft or drum arranged lengthwise and axially within the chamber and provided at its opposite ends with hollow arbors or trunnions 21, 22, which are journaled in bearings 23, 24 in the heads and which are connected by rotary joints 25, 26 with a steam supply pipe 27 and with a condensation outlet 28, whereby the material may be heated from within the chamber. The hollow shaft may be turned by a gear wheel 29 secured to one of its arbors and receiving power from any available source.

A plurality of supporting rings are mounted circumferentially on the periphery of the hollow shaft or drum at suitable intervals throughout the length thereof, each of these rings being preferably constructed of two semi-circular sections 30, 30 which have their corresponding ends detachably connected by bolts 31. Each of these rings is provided with a plurality of laterally projecting supporting arms 32 and adjacent to the rear side of each of these arms with a stop 33. Between each ring and the inner side of the cylindrical wall of the drying chamber are arranged a plurality of scraper arms 34 which are spaced equidistant in an annular row and each of these arms being pivotally connected at its front end with one of said supporting arms by a horizontal pivot pin 35 which is arranged parallel with the axis of the chamber so that the rear end of the scraper arm can swing toward and from the bore of the chamber. The inward movement of the scraper arms is limited by a stop 36 arranged on the inner side of each scraper arm in rear of its pivot and adapted to engage with the adjacent stop 33 on the respective ring. On the read ends of the scraper blades are mounted the scraper, mixing or stirring blades 37 each blade being preferably supported at its opposite ends by a pair of scraper arms, and the several scraper arms and blades being so disposed within the drying chamber that they form a plurality of annular rows of blades, and the blades in each row are arranged lengthwise in line with the spaces between the blades of an adjacent row, thereby staggering the blades relatively to each other and causing the same to operate successively on the material under treatment.

Each of the scraper or stirring blades is preferably arranged at an angle on the respective scraper arms so that the same and the wall of the chamber converge forwardly or in a direction in which the blades turn bodily within the chamber. The front part of each blade is flat and provided with a straight scraping edge 39 while the rear part 40 of the blade is bent, curled or deflected inwardly relatively to the front part thereof in the form of a flange.

In the practical operation of the drier the chamber is usually filled partly with the material to be treated, which material rests on the lower part of the chamber leaving a vacant space in the upper part of the same.

As each blade moves circumferentially through the upper part of the chamber the same drops by gravity together with its arms away from the top of the chamber and does not produce any scraping operation therein. The movement of the blade away from the wall at this time is limited by engagement of the stops 36 on the respective scraper arms with those on the adjacent supporting rings.

As each blade sweeps through the space between the lower side of the shaft and the lower part of the cylindrical wall of the drying chamber the blade drops by gravity together with its supporting arms from its inward position in which it is out of engagement with the wall of the chamber into a position in which its front edge engages with the bore of the chamber wall. While in this position the blade scrapes the material from the lower part of the chamber and lifts it so that other material can take its place in contact with the heated surface. The material thus removed by the scraper blade is first deflected inwardly part way toward the center of the chamber by the inclined flat front part of the blade and then deflected inwardly still further and with a more pronounced action by the inwardly bent or deflected rear part of the blade which acts to give the material a sharp inward throw. By this means the material is repeatedly scraped from the wall of the chamber and stirred or tumbled about so that all parts thereof are repeatedly brought into contact with the heated surface whereby the same is effectively agitated and dried rapidly, thoroughly and uniformly.

As each blade moves through the body of the material under treatment the wedge action of the inclined inner side of the blade by engagement with this material causes the blade to be pressed or thrust outwardly and held with its advancing front edge firmly in engagement with the bore of the chamber, thereby insuring an effective operation of the scraper for removing the material from the chamber wall and expediting the drying and mixing operations.

These means for stirring the material are not only very simple in construction and not liable to get out of order, but they also increase the output of the drier on account of their greater efficiency.

Furthermore, the cost of construction is materially reduced inasmuch as no particular care is required to mount the rotary shaft exactly concentric with the chamber as has been necessary heretofore because in the present case the scraper blades will engage effectively with the bore of the chamber notwithstanding that the shaft may not be in the center of the drying chamber or that there may be irregularities in the surface of the shell.

I claim as my invention:

1. A drier comprising a horizontal cylindrical shell, a horizontal shaft arranged axially within the shell, a plurality of supports arranged on said shaft, a scraper arm pivoted on each of said supports, and a blade mounted on the rear end of each of said arms and having a flat inclined body and adapted to engage its front edge with the inner side of said shell and provided at its rear edge with an abrupt inwardly curled flange.

2. A drier comprising a horizontal cylindrical shell, a horizontal shaft journaled axially within the shell, a plurality of supporting rings each of which is mounted on the periphery of said shaft and provided with a circumferential row of supporting arms and an outwardly facing stop shoulder adjacent to the rear side of each of these supporting arms, a scraper arm pivoted with its advancing front end on the outer end of each supporting arm and provided in rear of said supporting arm with an inwardly projecting stop lug which is adapted to engage with the stop shoulder of the respective supporting arm, and an inclined scraper blade mounted on the rear end of said scraper arm and adapted to engage its front edge with the inner side of said shell.

In testimony whereof I affix my signature.

HARLAN W. HOW